Sept. 25, 1956　　　　E. J. FISHER　　　　2,764,392
BLENDING AND MIXING MACHINE
Filed Feb. 28, 1955
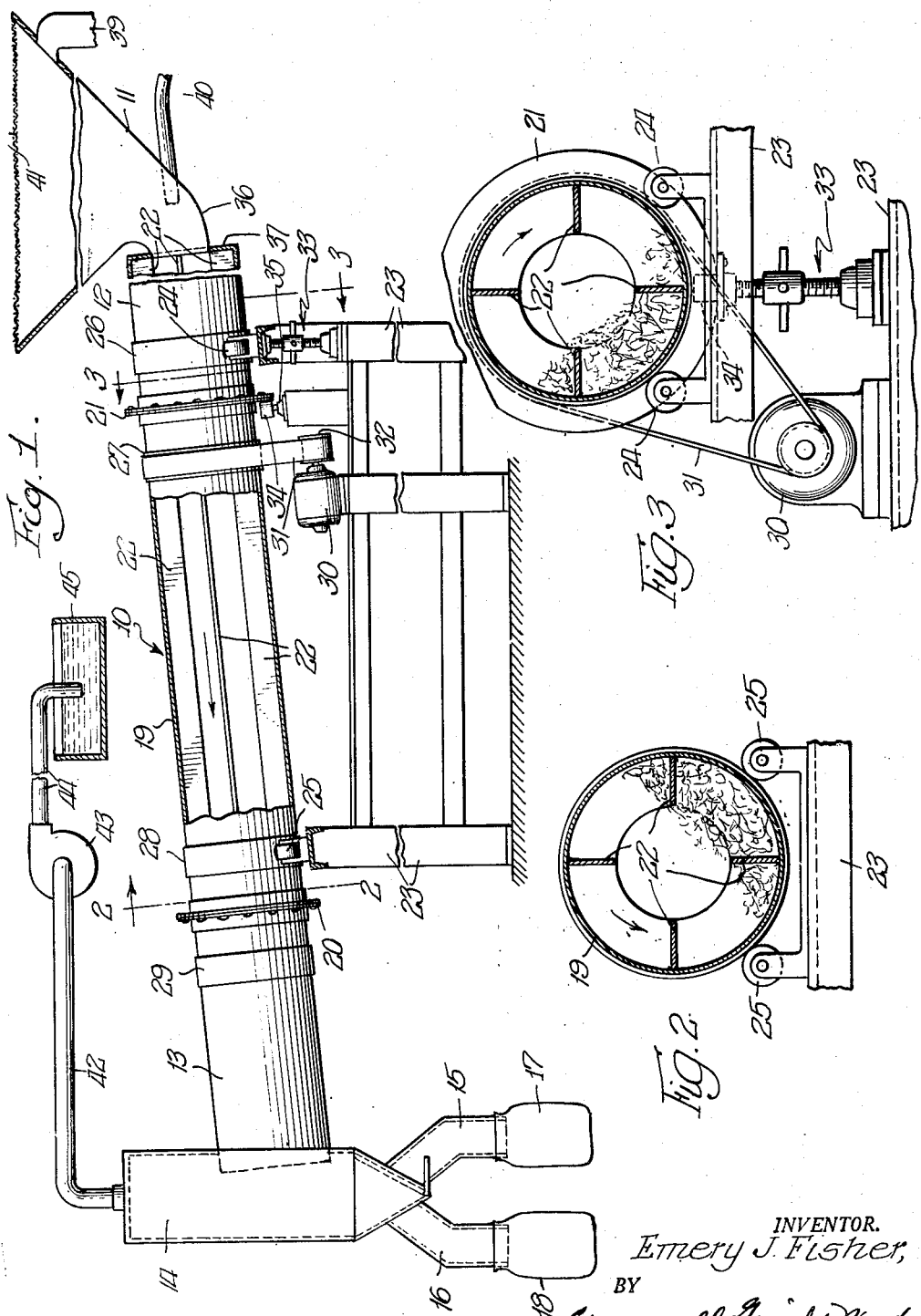
INVENTOR.
*Emery J. Fisher,*
BY
*Cromwell, Greist & Warden*
ATTYS

United States Patent Office 2,764,392
Patented Sept. 25, 1956

2,764,392

BLENDING AND MIXING MACHINE

Emery J. Fisher, Chicago, Ill.

Application February 28, 1955, Serial No. 491,076

4 Claims. (Cl. 259—3)

This invention relates to blending machines. More particularly, it pertains to a blending machine for continuously receiving, mixing, advancing and discharging therefrom mixtures of comminuted fibrous and particulate materials, such as rock wool, mineral wool, asbestos, glass wool, exploded mica, cement, vermiculite, dry adhesives and fireproof materials.

Heretofore such materials have been mixed manually, or by a batch mixing device consisting of curved agitator blades revolving in a semi-cylindrical shell. Materials so mixed in dry form are used for purposes of thermal and acoustical insulation on walls and ceilings of buildings. They may also be used for fireproofing structural steel members such as supporting steel columns, steel beams, steel purlins, and the like in buildings. Such materials, when properly mixed, can be blown through the discharge port of a spray gun simultaneously with one or more atomized cone-like sprays of adhesive. As the material leaves the spray gun the particles are individually coated with the adhesive, with or without additional agents such as fireproofing compounds, at the same time during which the wall, ceiling, or structural steel surfaces are being coated. The particles thus become adhered to such surfaces and at the same time become adhered to each other. The spraying is continued until a mat of a desired thickness is built up to provide the necessary thermal, acoustical and/or fireproof characteristics. Such a method of applying insulation is disclosed in Patents Nos. 1,718,507, 1,888,841 and 2,179,679 to Wenzel et al.

Both the manual or batch mixing of such materials as the foregoing has proved to be time-consuming and laborious. Furthermore, various batches of such materials were not always evenly mixed and blended and this is essential to proper application to wall, ceiling and structural steel surfaces as well as necessary to provide the proper thermal, acoustical and/or fireproof characteristics.

A principal object of the invention is the provision of a blending machine which is economical in operation and which will continuously receive, mix, advance and discharge therefrom such comminuted fibrous and particulate materials as the foregoing to produce a dry mixture of constant and uniform quality which is more suitable and desirable for the purposes above described.

More specifically, it is an object of the invention to provide such a blending machine as the foregoing which comprises an open-ended revolvable and inclined tubular shell adapted continuously to receive such materials in an unmixed condition at the upper end and to discharge the materials in a thoroughly mixed and blended condition at its lower end, the shell being provided with mixing and agitating members disposed inwardly of the shell for thoroughly mixing the materials and for advancing them in a blended condition to the discharge end of the shell as the latter rotates in its inclined position.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

For a fuller understanding of the nature and objects of the invention reference should be had to the following detailed description taken in connection with the accompanying drawing, in which:

Fig. 1 is a side elevational view partly in section and with parts broken away of a preferred form of machine embodying the present invention;

Fig. 2 is a transverse sectional view of the machine depicted in Fig. 1, taken along the lines 2—2 thereof and looking in the direction of the arrows; and Fig. 3 is a transverse sectional view of the machine depicted in Fig. 1, taken along the lines 3—3 thereof and looking in the direction of the arrows.

Referring more particularly to the drawing, there is disclosed an open-ended revolvable and inclined cylinder indicated generally at 10. It is adapted to receive such fibrous and particulate materials as hereinbefore specified in an unmixed condition through a hopper 11 which communicates with the upper end 12 of the cylinder 10. At the lower end 13 the cylinder 10 is adapted to discharge the materials in a thoroughly mixed and blended condition, preferably into a closed chamber 14 having, for example, spouts 15, 16 adapted to discharge directly into bags 17, 18. It will be understood that a bin or other chamber can be utilized wherein to direct the blended materials for storage if it is not desired to package the blended material immediately into bags.

It will be seen that the inclined cylindrical shell or tube has an intermediate section 19 between the upper and lower ends 12 and 13. Preferably, these sections are connected together, as by peripheral flanges 20 and 21.

The intermediate section 19 constitutes the main mixing chamber of the cylinder and contains mixing or agitating blades 22 securely fastened within the interior of the cylinder 19 as by welding or by any other suitable means. These blades are directed radially inwardly toward each other and any suitable number may be used in order to cascade the materials passed through the cylinder 10 when it is in motion as will be more fully described hereinafter.

The entire inclined cylinder 10, composed of sections 12, 13 and 19, is arranged to be rotated about its longitudinal axis. In order to accomplish this, the cylinder is held in raised position from the floor by a suitable framework or standard 23. Mounted on this framework are two oppositely disposed sets of rollers 24, 24, and 25, 25.

Spaced apart circular tracks or wear bands 26, 27, 28 and 29 are mounted on and around the outside of the cylinder 10 as shown. Two of these tracks, 27 and 28, are mounted on the intermediate section 19 of the cylinder. Tracks 26 and 29 are mounted on the end portions 12 and 13 respectively. The roller members 24, 24, and 25, 25, are so arranged and spaced apart that the tracks 26 and 28 are supported by these rollers respectively.

A driving motor 30 (e. g. an electric motor) is mounted upon the framework or standard 23. The motor 30 drives the cylinder 10 by means of a belt 31 running over a driving pulley 32 and around the track 27.

In order to control the angle of inclination or pitch of the cylinder 10, the end section 12 of the cylinder overlies a screw jack arrangement indicated generally at 33, below the rollers 24, 24 so that the cylinder can be raised or lowered to increase or retard the flow of materials therethrough.

In order to maintain the cylindrical arrangement in its inclined position and to prevent the same from shifting downward, there is provided a roller thrust bearing arrangement which constitutes a roller 34 mounted on a standard 35 which in turn is secured to the framework 23. This thrust roller abuts one face of the flange 21 thereby permitting the mixing cylinder 10 easily to rotate without shifting out of position.

It will be appreciated that there will be a certain amount of wear and tear where all of the parts are in frictional engagement and it is primarily for this purpose that the entire cylindrical arrangement is constructed in three sections, namely 12, 13 and 19. When the parts become worn, for example, because of the frictional engagement of the thrust bearing 34 against the flange 21, and because of the frictional engagement of the rollers 24, 25 with the tracks 26, 28, it will be a simple matter for the separate sections 12, 13 and 19 to be disconnected at the flanges. Thus, the section 13 can be interchanged with the section 12 so that the circular track 29 can be mounted on the rollers 24, 24. Also, the intermediate section can be turned end for end in a rearrangement of the entire cylinder so that the circular tracks 27 can be mounted upon the rollers 23, 25 and the track 28 can be utilized as a driving track for the belt 31.

The hopper 11 comprises an upper portion which has converging side walls and a bottom discharge portion in the form of an elbow 36 of circular cross section. The discharge side of the elbow 36 fits the central opening in an annular plate 37 fastened over the upper end of the section 12 of the rotary tubular body 10.

The dry material to be blended may be produced into the hopper 11 from several sources. For example, rock wool or mineral wool which has been cleaned so as to remove hard foreign bodies including large clinkers, beads and sand, may be introduced into the upper portion of the hopper 11 through the connection indicated at 39. Exfoliated asbestos, with or without additional dry material such as cement, may be introduced into the lower portion of the hopper 11 through the conduit 40.

Since the dry material introduced into the hopper 11 through the connections 39 and 40 will normally be blown therein, in order to relieve pressure the top of the hopper 11 is closed by a pervious filter material such as burlap or other suitable filter cloth or screen as indicated at 41. Accordingly, the pressure within the chamber 11 is relieved without loss of material and without creation of dust.

In order to prevent formation of dust at the discharge end of the apparatus and to reduce resistance to the flow of the dry granular and fibrous materials through the blending tube 10, the closed chamber 14 is provided with a conduit connection adjacent the top thereof which is indicated at 42 and which leads to the inlet connection of a blower 43. The outlet connection of the blower 43 discharges through a conduit 44 into a water tank 45 which serves as a trap for catching any entrained dust or dirt. The blower 43 can be operated at such a speed as to create a slight negative pressure in the chamber 14. This enables the bags to be filled from the chutes and also tends to draw the light fibrous and granular materials downwardly through the rotating cylinder 10.

In operation, it is desirable to keep a constant flow of comminuted fibrous and particulate materials passing through the entire machine. Preferably, such materials are fed in their unmixed state through the hopper 11 from the floor above. As they enter the mixing chamber the agitating or mixing blades will constantly cascade or churn the particles without jamming or grinding so that they maintain a blended condition which is very fluffy and loose. This provides a mixture or blend of such materials which is quite contrary to that heretofore obtained in which the particles, especially when passed through conventional batch mixing machines, were either ground into powdery form or knotted and twisted so as to make their subsequent application to wall surfaces difficult and often resulted in providing a mat of irregular and undesirable characteristics. The mixing of such materials is continuous and the mixing members constantly advance the blended mixture through the section 13 and discharge it therefrom preferably through a hopper 14 as hereinbefore described.

It will thus be seen that the objects hereinbefore set forth may readily and efficiently be attained, and since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention what I claim as new and desire to secure by Letters Patent is:

1. Blending and mixing apparatus comprising an elongated tubular body composed of at least one intermediate section and opposite end sections, said intermediate section having peripheral flanges on opposite ends thereof, each of said end sections being coaxially and removably connected to the adjacent end of said intermediate section by means of a peripheral end flange which mates with the flange on the adjacent end of said intermediate section, each of said end sections having circumferential wear bands mounted thereon and equi-spaced from the adjacent end flange, said intermediate section having wear bands mounted on opposite ends thereof at corresponding distances from the adjacent ends thereof, support means for said tubular body comprising two sets of support rollers upon which said tubular body is rotatably supported, said sets of rollers being spaced a distance equal to the spacing between a wear band adjacent one end of said intermediate section and the wear band on the remote end section, vertically adjustable support means for at least one of said sets of support rollers whereby the pitch of said tubular body may be adjusted, thrust roller means disposed for engaging the lower side of at least one of said peripheral flanges so as to retain said tubular body in inclined position on said sets of support rollers, power means for rotating said tubular body about the longitudinal axis thereof and power transmitting means connecting said power means in driving relationship with said body.

2. The apparatus called for in claim 1 wherein said power transmitting means is a belt adapted to run over the wear band on the upper end of said intermediate section.

3. The apparatus called for in claim 1 wherein longitudinally extending agitating blades are mounted on the interior of said tubular body with each of said blades terminating at the opposite ends of said tubular body and with said opposite ends being partially closed by annular members secured thereto and which cover the adjacent ends of said agitating blades, and said apparatus having a feed hopper the bottom discharge end of which is an elbow which projects into the central opening in the annular member at the upper end of said tubular body.

4. The apparatus called for in claim 1 comprising a feed hopper at the upper end of said tubular body the top of which is closed by a permeable filter material, a closed discharge chamber at the lower end of said tubular body having material outlet openings in the bottom thereof, a suction fan, and conduit means at the top for connecting said chamber to the inlet connection of said fan.

References Cited in the file of this patent

UNITED STATES PATENTS

| | | |
|---|---|---|
| 570,745 | Cleveland | Nov. 3, 1896 |
| 605,923 | Schule | June 21, 1898 |
| 615,519 | Barr | Dec. 6, 1898 |
| 1,991,959 | Roser | Feb. 19, 1935 |